and subsequently heating the mixture.

United States Patent [19]
Kirchmayr et al.

[11] 4,288,560
[45] Sep. 8, 1981

[54] PROCESS FOR FOAMING PLASTICS

[75] Inventors: Rudolf Kirchmayr, Aesch; Werner Fussenegger, Basel; Hugo Illy, Reinach, all of Switzerland

[73] Assignee: Ciba-Geigy Corporation, Ardsley, N.Y.

[21] Appl. No.: 180,738

[22] Filed: Aug. 25, 1980

Related U.S. Application Data

[63] Continuation of Ser. No. 57,530, Jul. 13, 1979, abandoned.

[30] Foreign Application Priority Data

Jul. 21, 1978 [CH] Switzerland ..................... 7906/78

[51] Int. Cl.³ ............................................... C08J 9/08
[52] U.S. Cl. ........................................ 521/90; 521/115; 521/143; 521/146; 521/180; 521/182; 521/184; 521/189
[58] Field of Search .................. 521/90, 115, 143, 146, 521/180, 182, 184, 189

[56] References Cited

U.S. PATENT DOCUMENTS

| | | | |
|---|---|---|---|
| 2,610,157 | 9/1952 | Gluesenkamp | 260/2.5 N |
| 3,442,829 | 5/1969 | Moore et al. | 260/2.5 N |
| 3,560,492 | 2/1971 | Burk, Jr. | 260/240 |
| 3,725,321 | 4/1973 | Wirth et al. | 260/2.5 N |
| 3,793,254 | 2/1974 | Wolgemuth | 528/315 |
| 4,097,425 | 6/1978 | Niznik | 260/2.5 N |
| 4,104,195 | 8/1978 | Ley | 252/350 |

*Primary Examiner*—Morton Foelak
*Attorney, Agent, or Firm*—Luther A. R. Hall

[57] ABSTRACT

A process for foaming thermoplastic materials by adding to the plastics material 0.05 to 5 percent by weight of a dioxazolone of the formula I

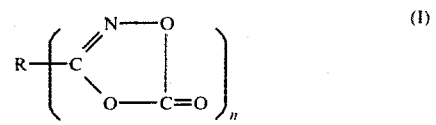

in which
n is 1, 2 or 3, and when n is 1
R is $C_1$–$C_{12}$-alkyl, $C_2$–$C_{12}$-alkenyl, $C_7$–$C_9$-aralkyl, $C_3$–$C_6$-cycloalkyl, $C_6$–$C_{10}$-aryl, or phenyl substituted by $C_1$–$C_9$-alkyl, halogen, $C_1$–$C_9$-alkoxy or nitro, or it is a heterocyclic radical, or when n is 2
R is $C_1$–$C_8$-alkylene, ethenylene, m- or p-phenylene, m- or p-halophenylene, biphenylene, oxy-bis-(p-phenylene), 2,5-thienylene, 2,5-furylene, 2,6-pyridylene or naphthylene, or when n is 3
R is phenenyl, and subsequently heating the mixture.

9 Claims, No Drawings

PROCESS FOR FOAMING PLASTICS

This is a continuation of application Ser. No. 57,530, filed on July 13, 1979, now abandoned.

The invention relates to a process for foaming thermoplastic materials (thermoplasts) by adding chemical blowing agents which decompose when heated and give off gas.

The production of foamed moulded shapes from thermoplastics by the addition of chemical blowing agents in the moulding process, for example during injection moulding or extrusion, has been known for a long time. The decomposition of the blowing agent occurs in the plasticised thermoplastic material, and the decomposition temperature should be between the softening temperature of the thermoplastic material and the maximum processing temperature. The decomposition temperature of the blowing agent should preferably be about 20° C. below the maximum processing temperature in order to obtain a homogenous cellular structure and maximum utilisation of the blowing agent.

The decomposition of the blowing agent has therefore to occur within a relatively narrow temperature range. The gas formed on decomposition should be odorless and inert. The blowing agent should break down completely into gaseous decomposition products, or alternatively the non-gaseous decomposition products should be soluble in the plastics material, and must not lead to discoloration or to changes in the physical or chemical properties of the plastics material.

The blowing agents hitherto known do not in most cases satisfy all these requirements, and are therefore suitable mainly only for specific fields of application. Thus, for example, organic hydrazides and semicarbazides split off ammonia, as a result of which polyesters or polycarbonates can be ammonolytically broken down. The known azodicarbonamide forms solid decomposition residues which are insoluble in the customary thermoplasts. Its use moreover is associated with a considerable smell contamination during foaming. 5-Phenyltetrazole has also already been suggested as a blowing agent, especially for the foaming of thermoplasts having relatively high processing temperatures. This blowing agent leads neither to a smell nuisance nor to a formation of residues; it gives however a gas yield lower than that of azodicarbonamide, and tends to cause discolouration.

It was the object of the present invention to find chemical blowing agents for foaming thermoplastic materials, which blowing agents do not have the disadvantages described above, and which at the same time produce a higher gas yield.

The subject matter of the present invention is a process for foaming thermoplastic materials by adding to the plastics material 0.05 to 5 percent by weight of a dioxazolone of the formula I

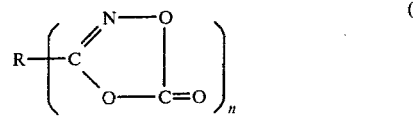
(I)

in which
n is 1, 2 or 3, and when n is 1
R is $C_1$–$C_{12}$-alkyl, $C_2$–$C_{12}$-alkenyl, $C_7$–$C_9$-aralkyl, $C_3$–$C_6$-cycloalkyl, $C_6$–$C_{10}$-aryl, or phenyl substituted by $C_1$–$C_9$-alkyl, halogen, $C_1$–$C_9$-alkoxy or nitro, or it is a heterocyclic radical, or when n is 2 R is $C_1$–$C_8$-alkylene, ethenylene, m- or p-phenylene, m- or p-halophenylene, biphenylene, oxy-bis-(p-phenylene),

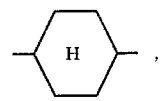

2,5-thienylene, 2,5-furylene, 2,6-pyridylene or naphthylene, or when n is 3
R is phenenyl, and
subsequently heating the mixture.

As $C_1$–$C_{12}$-alkyl, R is branched-chain or straight-chain alkyl, particularly that having 1–6 C atoms, such as methyl, ethyl or isopropyl. As $C_2$–$C_{12}$-alkenyl, R is branched-chain or especially straight-chain alkenyl, in particular that having 2–6 C atoms, such as vinyl. As $C_7$–$C_9$-aralkyl, R is above all benzyl, and as $C_3$–$C_6$-cycloalkyl it is in particular cyclopentyl or cyclohexyl. As $C_6$–$C_{10}$-aryl, R is particularly phenyl or naphthyl, and as phenyl substituted by $C_1$–$C_9$-alkyl, it is especially $C_1$–$C_4$-alkyl-phenyl, such as methylphenyl; as phenyl substituted by halogen, it is in particular chlorophenyl, bromophenyl or dichlorophenyl; and as phenyl substituted by $C_1$–$C_9$-alkoxy, it is above all methoxyphenyl. As a heterocyclic radical, R is especially an aromatic heterocyclic radical, such as thienyl, furyl or pyridyl. As $C_1$–$C_8$-alkylene, R is branched-chain or in particular straight-chain alkylene, especially that having 1–4 C atoms, such as methylene, ethylene, 1,3-propylene or 1,4-butylene. As m- or p-halophenylene, R is for example 2,5-dichlorophenyl-1,4-ene or 2,5-dibromophenyl-1,4-ene.

Compounds of the formula I preferably used are those in which n is 1 or 2, and when n is 1 R is $C_1$–$C_{12}$-alkyl, phenyl or phenyl substituted by methyl, chlorine, methoxy or nitro; or when n is 2 R is $C_1$–$C_4$-alkylene, ethenylene, m- or p-phenylene, 2,5-thienylene, 2,6-pyridylene or naphthylene.

Particularly preferred are for example also the following compounds and in particular the compounds used in the illustrative Examples:
2-methyl-1,3,4-dioxazolone-(5),
2-ethyl-1,3,4-dioxazolone-(5),
2-isopropyl-1,3,4-dioxazolone-(5),
2-vinyl-1,3,4-dioxazolone-(5),
2-benzyl-1,3,4-dioxazolone-(5),
2-cyclohexyl-1,3,4-dioxazolone-(5),
2-cyclopentyl-1,3,4-dioxazolone-(5),
2-phenyl-1,3,4-dioxazolone-(5),
2-(2-methylphenyl)-1,3,4-dioxazolone-(5),
2-(4-methylphenyl)-1,3,4-dioxazolone-(5),
2-(4-chlorophenyl)-1,3,4-dioxazolone-(5),
2-(3,4-dichlorophenyl)-1,3,4-dioxazolone-(5),
2-(4-methoxyphenyl)-1,3,4-dioxazolone-(5),
2-(3-nitrophenyl)-1,3,4-dioxazolone-(5),
2-thienyl-1,3,4-dioxazolone-(5),
2-furyl-(1,3,4-dioxazolone-(5),
2-pyridyl-1,3,4-dioxazolone-(5),
2-naphthyl-1,3,4-dioxazolone-(5),
1,1-bis-[1,3,4-dioxazolon-(5)-yl-(2)]-methane,
1,2-bis-[1,3,4-dioxazolon-(5)-yl-(2)]-ethane,
1,4-bis-[1,3,4-dioxazolon-(5)-yl-(2)]-butane,
1,2-bis-[1,3,4-dioxazolon-(5)-yl-(2)]-ethylene, 1,4-bis-[1,3,4-dioxazolon-(5)-yl-(2)]-benzene,
1,3-bis-[1,3,4-dioxazolon-(5)-yl-(2)]-benzene,
1,4-bis-[1,3,4-dioxazolon-(5)-yl-(2)]-2,5-dichlorobenzene,
1,4-bis-[1,3,4-dioxazolon-(5)-yl-(2)]-2,5-dibromobenzene,
1,4-bis-[1,3,4-dioxazolon-(5)-yl-(2)]-naphthalene,
2,6-bis-[1,3,4-dioxazolon-(5)-yl-(2)]-naphthalene,
4,4-bis-[1,3,4-dioxazolon-(5)-yl-(2)]-diphenyl,
4,4-bis-[1,3,4-dioxazolon-(5)-yl-(2)]-diphenyl ether,
2,5-bis-[1,3,4-dioxazolon-(5)-yl-(2)]-thiophene,
2,5-bis-[1,3,4-dioxazolon-(5)-yl-(2)]-furan,
2,6-bis-[1,3,4-dioxazolon-(5)-yl-(2)]-pyridine, and
1,3,5-tris-[1,3,4-dioxazolon-(5)-yl-(2)]-benzene.

The compounds of the formula I are known. If there should be a compound among them which is still new, it can be produced in a manner known per se and by a method analogous to that for producing the known compounds. Thus, Beck describes in Ber. 84, 688–689 (1951) a synthesis, namely the reaction of hydroxamic acids with phosgene, so that compounds of the formula I can be produced by a process comprising reacting a hydroxamic acid of the formula II

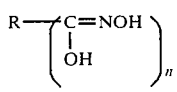
(II)

with phosgene, advantageously by passing phosgene into a solution of the hydroxamic acid in an inert solvent, such as ether, tetrahydrofuran, benzene, toluene or chlorobenzene. From the stated publication, compounds of the formula I are known for the purpose of scientific studies of stereoisomerism. From numerous other publications, compounds of the formula I are known as polymerisable monomers, for example from U.S. Pat. No. 3,560,492 or from the German Offenlegungsschrift No. 1,959,203, without however any reference being made to a utilisation according to the present invention or any suggestion of such a utilisation being made.

Thermoplastic materials (thermoplasts) which can be foamed according to the invention are for example: polyolefins such as polyethylene or polypropylene, polystyrene or styrene copolymers, such as IPS or ABS polymers, polyvinyl chloride, polyacetals, polycarbonates, aromatic polyethers, polysulfones and polysulfone ethers, polyesters such as polyethylene- or polybutylene- terephthalate, polyamides such as polycaprolactam and nylon -6,6, and also mixtures of polymers of this type. Since the decomposition temperature of the compounds of the formula I can be varied within certain limits by the choice of the substituent R, plastics having different processing temperatures can be foamed. In this manner, the compounds of the formula I are suitable for foaming at temperatures of 160° C. to above 300° C., preferably between 180° C. and 280° C. The process according to the invention is therefore suitable for the foaming preferably of polypropylene, polystyrene, styrene copolymers, polycarbonates, polyamides, aromatic polyethers, polyesters and polysulfones. The process is particularly suitable for foaming polycarbonates, polyesters and aromatic polyethers.

The blowing agents can be added to the plastics by dry mixing, with preferably an adhesive being used. The adhesives used can be for example: long-chain fatty acids or salts thereof, esters or amides. The blowing agents can also be added in the dissolved form, or in the form of a master batch. The factor generally applying is that the more uniformly the blowing agent is mixed with the plastics material, the more finely porous and homogeneous the foam becomes.

The foaming of the mixture of the plastics material and blowing agent is effected by known processes comprising heating with simultaneous moulding. The most important methods are injection moulding and extrusion.

The amount of blowing agent added depends primarily on the degree of foaming desired; it depends also on the respective gas yield from the blowing agent employed. In general, 0.05 to 5 percent by weight, preferably 0.1 to 2 percent by weight, of blowing agent is used.

The plastics used can contain additives such as those customary in plastics technology, such as fillers and reinforcing agents, glass fibres, pigments, lubricants, stabilisers, antistatic agents, nucleation agents, flameproofing agents, plasticisers, emulsifiers or optical brighteners. Additives of this kind can be added simultaneously with the blowing agents.

The Examples which follow illustrate the use of the compounds of the formula I. Except where otherwise stated, 'parts' are parts by weight, temperatures are in degrees Centigrade, and percentages are percent by weight.

EXAMPLE 1

A commercial granulated polycarbonate which contains 5% of glass fibres (Lexan FL 900, General Electric) and which has a viscosity number of 0.469 and a density of 1.2 g/ccm is dried for 4 hours in an oven at 120°. It is then premixed with 0.1% of butyl stearate for 20 minutes in order to ensure the adhesion of the blowing agent; it is then mixed, by rotation, with 0.21% of 1,4-bis-[1,3,4-dioxazolon-(5)-yl-(2)]-benzene, and the whole is mixed in a Rhönrad mixer for a further 20 minutes.

The mixture thus obtained is processed, in an injection moulding machine, into the form of rectangular plates having dimensions of 80×50×6 mm. The cylinder temperatures are 270°/300° and 290°. With a mould temperature of 120° C., the cooling time is 80 seconds. The moulding obtained has a viscosity number of 0.439 and a density of 0.85 g/cm$^3$. It has a smooth surface and a foamed core having a fine homogeneous pore structure, and it shows no discolouration.

EXAMPLE 2

A commercial granulated polybutyleneterephthalate (Crastin SK 605, Ciba-Geigy AG) having a glass-fibre content of 30% and a density of 1.53 g/cm$^3$ is dried for 8 hours at 100° in vacuo, and is then mixed with 0.1% of butylstearate and 0.25% of 2-phenyl-1,3,4-dioxazolone-(5). The mixture is processed into the form of plates in the manner described in Example 1 except that the temperature of the individual heating zones of the injection moulding machine is 230°/260° and 260°. The plates obtained have a density of 0.8 g/cm$^3$.

EXAMPLE 3

A commercial polycarbonate granulate (Lexan FL 900, General Electric) is ground in a mill to a particle size of 315 μm. The polycarbonate contains 5% of glass fibres and has a density of 1.2 g/cm$^3$. Before being processed, the polymer is dried for 4 hours in an air-circulation oven at 120°. 50 g of the dried polycarbonate powder is mixed in each case with 0.3 g of 1,4-bis-[1,3,4-dioxazolon-(5)-yl-(2)]-benzene to obtain a homogeneous mixture. In each case, 6 g of this mixture is placed into a cylindrical aluminium mould which is closable by screwing and which has a content of 11 cm$^3$, and the closed mould is transferred to an oven at 340°. After a retention time of 12 minutes—the foamed plastics material attains in this time a maximum temperature of 320°—the mould is removed from the furnace and cooled with cold water. The specimens taken from the mould have a density of 0.47–0.50 g/cm$^3$, a smooth surface and a foamed core. Compared with a comparative specimen produced without a blowing agent, the foamed specimens display no change of colour. Analogous results are obtained with 1,4-bis-[1,3,4-dioxazolon-(5)-yl-(2)]-butane and 1,2-bis-[1,3,4-dioxazolon-(5)-yl-(2)]-ethylene.

EXAMPLE 4

A commercial polyphenylene oxide granulate (Noryl FN 215, General Electric) is ground in a mill to a particle size of 400 μm. It has a density of 1.06 g/cm$^3$, and before being processed is dried for 3 hours at 100° in an air-circulation oven. 50 g of the polyphenylene oxide powder is mixed in each case with 0.3 g of 1,4-bis-[1,3,4-dioxazolon-(5)-yl-(2)]-benzene to obtain a homogeneous mixture. In the manner described in Example 3, 7.5 g of this mixture is foamed each time in a mould having a capacity of 11 cm$^3$ by 15 minutes' heating in an oven at 320° (internal temperature of the mould is 310° maximum). The foamed specimens have a foamed core with a density of 0.58–0.71 g/cm$^3$. The blowing agents used cause no change of colour.

EXAMPLE 5

A commercial polybutyleneterephthalate (Crastin S 600, Ciba-Geigy AG) is ground in a mill to a particle size of 400 μm. It has a density of 1.31 g/cm$^3$, and before being processed it is dried for 8 hours at 100° in a vacuum drying chamber. 50 g of the PBT powder is then homogenised in each case with 0.3 g of 2-phenyl-1,3,4-dioxazolone-(5). In each case, 6 g of this mixture is heated, as described in Example 3, in a closed mould for 12 minutes in an oven at 320° C. (maximum internal temperature of the mould is 300°). The specimens obtained have a density of 0.48–0.50 g/cm$^3$, a smooth surface and a foamed core. Analogous results are obtained by using 0.3 g of 2-isopropyl-1,3,4-dioxazolone-(5) as the blowing agent instead of 2-phenyl-1,3,4-dioxazolone-(5).

EXAMPLE 6

A commercial polyamide 6 (Grilon A 28, Emser-Werke AG) is ground in a mill to a particle size of 400 μm. It has a density of 1.14 g/cm$^3$, and before being processed it is dried for 8 hours at 80° in a vacuum drying chamber. 50 g in each case of the polyamide powder is mixed with 0.3 g of 2-phenyl-1,3,4-dioxazolone to obtain a homogeneous mixture. In each case, 6.5 g of this mixture is heated, as described in Example 3, in a closed mould for 10 minutes in an oven at 340° (maximum internal temperature of the mould is 285°). The resulting specimens have a foamed core with a density of 0.51–0.54 g/cm$^3$. The blowing agent used causes no change of colour.

EXAMPLE 7

In each case, 50 g of a commercial polypropylene powder (Propathene HF 20, Imperial Chemical Industries), having a density of 0.9 g/cm$^3$ and a particle size of 250 μm, is homogeneously mixed with 0.3 g of 1,4-bis-[1,3,4-dioxazolon-(5)-yl-(2)]-benzene and 0.05 g of a commercial antioxidant (Irganox 1010, Ciba-Geigy AG). 5.5 g of this mixture in each case is foamed, in the manner described in Example 3, in a closed mould, the mould being heated for 12 minutes in an oven at 375° (maximum internal temperature of the mould is 330° C.). The removed specimens have a density of 0.45 g/cm$^3$, a smooth surface and a foamed core. The blowing agent used causes no change of colour.

EXAMPLE 8

A commercial low pressure polyethylene (Vestolen A 6016, Chemische Werke Hüls AG) having a density of 0.962 g/cm$^3$ is ground in a mill to a particle size of 315 μm. 50 g of the polyethylene powder is homogeneously mixed with 0.3 g of 2-phenyl-1,3,4-dioxazolone-(5), and in each case 5 g of the mixture is heated, in the manner described in Example 3, in a closed mould for 9 minutes in an oven at 375° (maximum internal temperature of the mould is 280° C.). The specimens obtained have a density of 0.41 g/cm$^3$, a smooth surface and a foamed core. The blowing agent used causes no change of colour.

EXAMPLE 9

50 g of an impact resistant polystyrene powder (experimental product of the Belgochim company) having a particle size of 400 μm and a density of 1.05 g/cm$^3$ is homogeneously mixed with 0.05 g of a commercial antioxidant (Irganox 1076, Ciba-Geigy AG) and 0.3 g of 1,4-bis-[1,3,4-dioxazolon-(5)-yl-(2)]-benzene. 5.1 g of the mixture is foamed, in the manner described in Example 3, by heating the mould for 15 minutes in an oven at 280° (maximum internal temperature of the mould is 258°). The specimen obtained has a density of 0.42 g/cm$^3$, a smooth surface and a foamed core. The blowing agent used causes no change of colour.

What is claimed is:

1. A process for foaming thermoplastic materials by adding to the plastics material a blowing agent consisting essentially of 0.05 to 5 percent by weight of a dioxazolone of the formula I

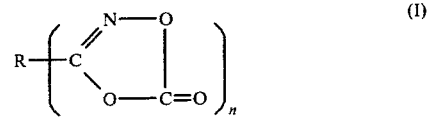

in which n is 1, 2 or 3, and when n is 1

R is $C_1$–$C_{12}$-alkyl, $C_7$–$C_9$-aralkyl, $C_3$–$C_6$-cycloalkyl, $C_6$–$C_{10}$-aryl, or phenyl substituted by $C_1$–$C_9$-alkyl, halogen, $C_1$–$C_9$-alkoxy or nitro; or is a heterocyclic radical, or when n is 2

R is $C_1$–$C_8$-alkylene, m- or p-phenylene, m- or p-halophenylene, biphenylene, oxy-bis-(p-phenylene), 1,4-cyclohexylene, 2,5-thienylene, 2,5-furylene, 2,6-pyridylene or naphthylene, or when n is 3

R is phenenyl, and subsequently heating the mixture.

2. A process according to claim 1, wherein there is used a compound of the formula I in which n is 1 or 2, and when n is 1 R is $C_1$–$C_{12}$-alkyl, phenyl or phenyl substituted by methyl, chlorine, methoxy or nitro; or when n is 2 R is $C_1$–$C_4$-alkylene, m- or p-phenylene, 2,5-thienylene, 2,6-pyridylene or naphthylene.

3. A process according to claim 1, wherein 1,4-bis-[1,3,4-dioxazolon-(5)-yl-(2)]-benzene is used.

4. A process according to claim 1, wherein 2-phenyl-1,3,4-dioxazolone-(5) is used.

5. A process according to claim 1, wherein the thermoplastic material is: polypropylene, polystyrene, a styrene copolymer, a polycarbonate, a polyamide, an aromatic polyether, an aromatic polyester or an aromatic polysulfone.

6. A process according to claim 1, wherein the thermoplastic material is a polycarbonate, an aromatic polyester or an aromatic polyether.

7. A process according to claim 1, wherein the mixture is heated to 230°–300° C.

8. A process according to claim 1, wherein 0.1 to 2 percent by weight of a compound of the formula I is added.

9. Foamable plastics composition comprising 95–99.95 percent by weight of a thermoplastic material a blowing agent consisting essentially of and 0.05–5 percent by weight of a dioxazolone of the formula I of claim 1.

* * * * *

UNITED STATES PATENT AND TRADEMARK OFFICE
CERTIFICATE OF CORRECTION

PATENT NO. : 4,288,560
DATED : SEPTEMBER 8, 1981
INVENTOR(S) : RUDOLF KIRCHMAYR ET AL

It is certified that error appears in the above—identified patent and that said Letters Patent is hereby corrected as shown below:

CLAIM 9, Column 8, lines 12 and 13 read:

"95-99.95 percent by weight of a thermoplastic material a blowing agent consisting essentially of and 0.05-5"

Should read:

-- 95-99.95 percent by weight of a thermoplastic material and a blowing agent consisting essentially of 0.05-5 --

Signed and Sealed this

Ninth Day of February 1982

[SEAL]

Attest:

GERALD J. MOSSINGHOFF

Attesting Officer     Commissioner of Patents and Trademarks